(12) United States Patent
Wu et al.

(10) Patent No.: US 10,797,576 B2
(45) Date of Patent: Oct. 6, 2020

(54) VIBRATION MOTOR

(71) Applicants: Na Wu, Shenzhen (CN); Zhilin Chai, Shenzhen (CN); Yan Shao, Shenzhen (CN); Fanghua Ling, Shenzhen (CN)

(72) Inventors: Na Wu, Shenzhen (CN); Zhilin Chai, Shenzhen (CN); Yan Shao, Shenzhen (CN); Fanghua Ling, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 229 days.

(21) Appl. No.: 15/358,607

(22) Filed: Nov. 22, 2016

(65) Prior Publication Data

US 2017/0373578 A1    Dec. 28, 2017

(30) Foreign Application Priority Data

Jun. 23, 2016  (CN) .................... 2016 2 0629878 U

(51) Int. Cl.
*H02K 33/16*  (2006.01)
*H02K 5/24*  (2006.01)
*H02K 33/18*  (2006.01)

(52) U.S. Cl.
CPC ............. *H02K 33/16* (2013.01); *H02K 5/24* (2013.01); *H02K 33/18* (2013.01)

(58) Field of Classification Search
CPC ........... H02K 33/16; H02K 33/18; H02K 5/24
USPC ......................................................... 310/14
See application file for complete search history.

(56) References Cited

U.S. PATENT DOCUMENTS

| 8,624,450 | B2* | 1/2014 | Dong ..................... | H02K 33/16 |
| | | | | 310/15 |
| 9,048,718 | B2* | 6/2015 | Zhang .................... | H02K 33/02 |
| 9,306,429 | B2* | 4/2016 | Akanuma ............... | H02K 5/24 |
| 9,748,827 | B2* | 8/2017 | Dong ..................... | H02K 33/16 |
| 10,277,102 | B2* | 4/2019 | Zhang .................... | H02K 41/02 |
| 10,284,066 | B2* | 5/2019 | Huang .................... | H02K 1/12 |
| 2009/0267423 | A1* | 10/2009 | Kajiwara ............... | H02K 33/16 |
| | | | | 310/36 |
| 2011/0018364 | A1* | 1/2011 | Kim ....................... | H02K 33/18 |
| | | | | 310/17 |
| 2011/0316361 | A1* | 12/2011 | Park ....................... | H02K 33/16 |
| | | | | 310/25 |
| 2012/0169151 | A1* | 7/2012 | Dong ..................... | H02K 33/16 |
| | | | | 310/25 |
| 2014/0152126 | A1* | 6/2014 | Kim ....................... | B06B 1/045 |
| | | | | 310/25 |

(Continued)

OTHER PUBLICATIONS

Received STIC search report from EIC 2800 searcher John DiGeronimo dated Aug. 3, 2018.*

*Primary Examiner* — Shawki S Ismail
*Assistant Examiner* — Htet Z Kyaw
(74) *Attorney, Agent, or Firm* — IPro, PLLC; Na Xu

(57) ABSTRACT

A vibration motor is disclosed. The vibration motor includes a housing; an elastic connecting piece; a fixed component; a vibrating component comprising a counterweight suspended in the housing by the elastic connecting piece; and a damping piece accommodated in the housing and fixed on the counterweight. One of the fixed component and the vibrating component includes coils, and the other includes a magnet. The counterweight includes a restricting protrusion extending from a side facing the elastic connecting piece for abutting against and restricting the damping piece.

9 Claims, 4 Drawing Sheets

(56) References Cited

U.S. PATENT DOCUMENTS

2016/0254736 A1* 9/2016 Jin .................. H02K 33/16
                                                310/25
2018/0026511 A1* 1/2018 Akanuma ........... H02K 35/02
                                                310/20

* cited by examiner

VIBRATION MOTOR

FIELD OF THE INVENTION

The invention is related to the technology of vibrators, and especially relates to a vibration motor for providing tactile feedbacks.

DESCRIPTION OF RELATED ART

The portable consumer electronic products are favored by more and more people along with development of the electronic technologies, such as mobile phone, handheld game player, navigation unit or handheld multimedia entertainment equipment, etc. The vibration feedback, which is taken as one feedback form of the portable consumer electronic product, has been extended to provide the tactile feedback related to application program and scene, etc. gradually from the initial and most fundamental coming call prompt, etc. While the motor is the primary element offering vibration feedback in the mobile equipment and usually comprises a rotary motor, a piezoelectric motor, a linear motor, etc., wherein the linear motor has the absolute advantage on the aspect of offering the tactile feedback related to the application program and the scene due to its small volume, long service life, low power dissipation, rapid response, etc.

When the vibration motor runs, a sufficient driving force should be guaranteed, otherwise the return time of vibration of the vibrating component is too long and results that the vibrating component cannot realize the rapid back-and-forth movement. However, when the driving force is too great, the amplitude of the vibrating component will be greater, and the vibrating component will impact the housing of the vibration motor to produce impact noise.

A damping piece is arranged between an elastic connecting piece and a vibrating component in the vibration motor of relevant technology, wherein the damping piece and the vibrating component are arranged as the complementary matching structure usually; thus, the damping piece can be engaged on the vibrating component. However, the performance of the whole vibration motor may be affected, and the vibration motor may have low reliability as a result of instable damping force and extra noise due to weak assembling of the damping piece and the vibrating component because the damping piece may offset easily during vibration.

Therefore, it is necessary to provide an improved vibration motor to overcome above disadvantage.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

Figure 1:
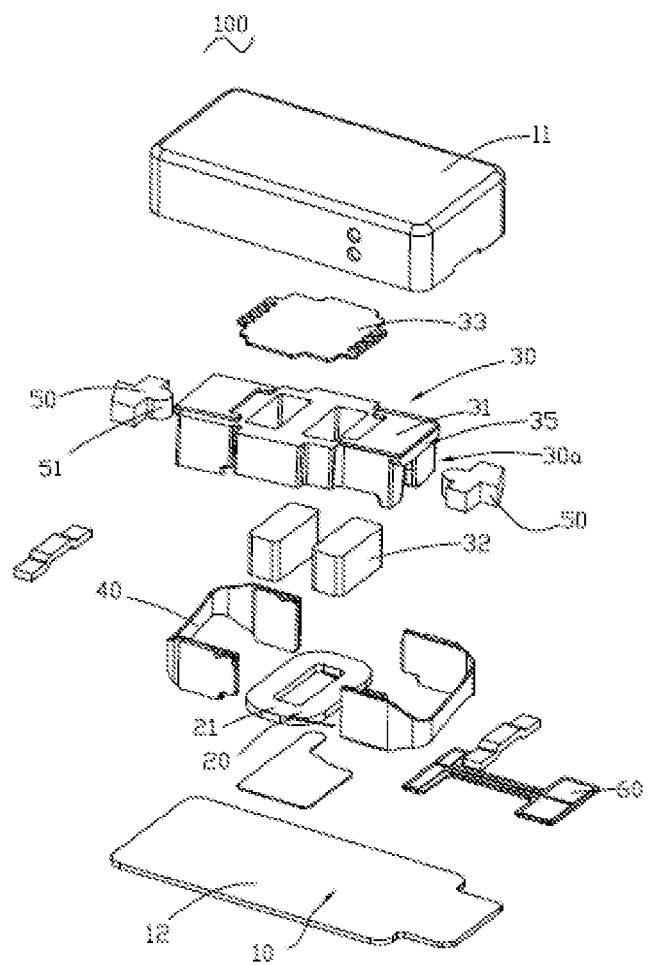
FIG. 1 is an exploded view of a vibration motor in accordance with a first embodiment of the present disclosure.
Figure 2:
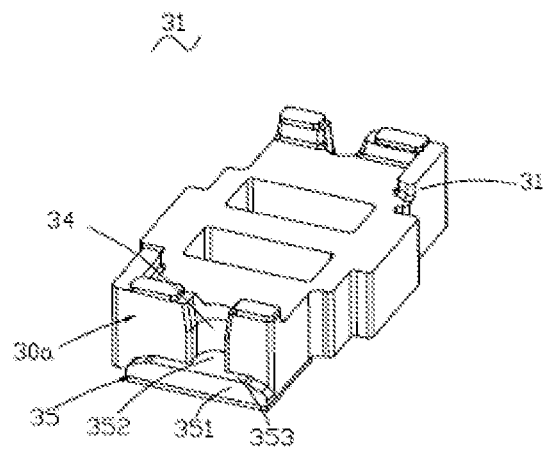
FIG. 2 is an isometric view of a counterweight of the vibration motor in FIG. 1.
Figure 3:
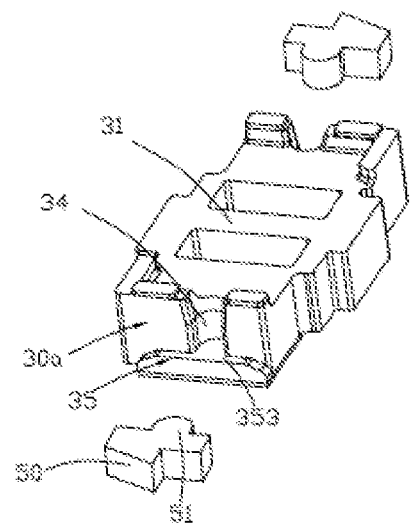
FIG. 3 is an exploded view of the counterweight and a damping piece of the vibration motor.

The present invention will hereinafter be described in detail with reference to several exemplary embodiments. To make the technical problems to be solved, technical solutions and beneficial effects of present disclosure more apparent, the present disclosure is described in further detail together with the figures and the embodiments. It should be understood the specific embodiments described hereby are only to explain this disclosure, not intended to limit this disclosure.

Referring to FIGS. 1-4, a vibration motor 100 in accordance with a first embodiment of the present disclosure comprises a housing 10 having an accommodating space, a fixed component 20, a vibrating component 30 and an elastic connecting piece 40 accommodated in the housing 10. The housing 10 comprises a housing body 11 and a cover plate 12 covering the housing body 11 for forming the accommodating space. The fixed component 20 is fixed on the cover plate 12. The vibrating component 30 comprises a counterweight 31 whose two sided parts are connected to the elastic connecting piece 40. Therefore, the vibrating component 30 is suspended in the accommodating space by the elastic connecting piece 40 for being capable of vibrating along a direction parallel to a length direction of the cover plate 12.

The fixed component 20 comprises coils 21 fixed on the cover plate 12, and the coils 21 are connected with an external circuit (not shown) by a circuit board 60 arranged on the cover plate 12 in order to input the electric signal. The vibrating component 30 comprises the counterweight 31, a magnet 32 which is accommodated in the counterweight 31 and a pole plate 33 which is adhered to an end surface on the counterweight 31 far from the cover plate 12.

Be noted that the fixed component 20 and the vibrating component 30 are not limited to the above-mentioned structural configuration. In fact, the components with locations which would not be changed with respect to the housing 10 can be taken as one part of the fixed component 20 in the vibration motor 100; while the components reciprocating in the accommodating space in presence of the electromagnetic induction force between the coils and the magnet can be taken as one part of the vibrating component 30. For example, the roles of the coils 21 and the magnet 32 can be exchanged in other embodiments. For example, the fixed component 20 can comprises the magnet which is fixed on the cover plate 12; while the vibrating component 30 shall include the coils correspondingly, and the coils can be suspended in the accommodating space.

The vibration motor 100 further comprises a damping piece 50 which is fixed on the vibrating component 30 in this embodiment. This embodiment, the damping piece 50 is positioned between the vibrating component 30 and the elastic connecting piece 40 preferably. The damping piece 50 shall be subjected to elastic deformation along the vibrating direction of the vibrating component 30 upon being extruded when the vibrating component 30 is located in the normal working amplitude; therefore, the vibrating component 30 can be prevented from direct collision with the elastic connecting piece 40, and further the service life of the vibration motor 100 can be ensured. Wherein, the damping material that the damping piece 50 is made of includes but not limited to rubber, and particularly and preferably, silica gel.

The vibrating component 30 and the damping piece 50 are complementary matching structures in this embodiment. Specifically, the damping piece 50 has an insertion part 51 in this embodiment, and slots 34 matching with the insertion part 51 are arranged on two sides 30a of the counterweight 31 facing the elastic connecting piece 40, respectively; therefore, the damping piece 50 are inserted on the counterweight 31.

As shown in FIGS. 1-4 specifically, restricting protrusions 35 for limiting the damping piece are formed in the way of extending and protruding on two sides 30a of the counterweight 31 facing the elastic connecting piece 40 in this embodiment, wherein the damping piece 50 is abutted on the restricting protrusions 35. The restricting protrusions 35 and the counterweight 31 are formed integrally in this embodiment, wherein the restricting protrusion 35 is presented as T-shape generally and includes a main body part 351 which is abutted to two sides 30a of the counterweight 31 facing the elastic connecting piece 40 and a projecting part 352 which matches with the slot 34 and is inserted to the slot 34; and the main body part 351 and the projecting part 352 are subjected to integral forming preferably. A bearing surface 353 is formed on the surface of the restricting protrusion 35 facing the cover plate 12 in this embodiment; the damping piece 50 can be born on the bearing surface 353; therefore, the damping piece 50 can be limited and prevented from shifting during vibration. Moreover, the bearing surface 353 is preferably matched with a contact surface which is in contact with the damping piece 50 and the restricting protrusion 35 approximately in the embodiment.

Figure 4:
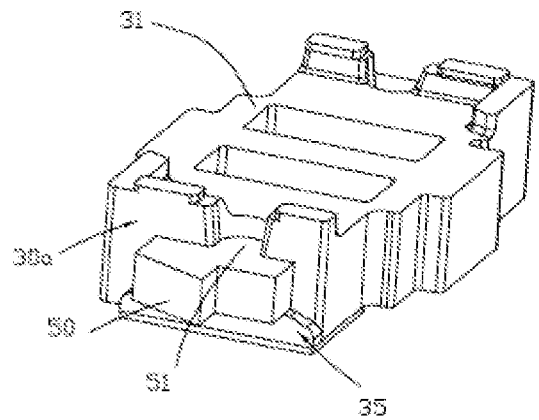
FIG. 4 is an assembled view of the counterweight and the damping piece in FIG. 3.

As shown in FIG. 4, the insertion part 51 of the damping piece 50 and the slot 34 of the counterweight 31 are inserted into each other during installation; the damping piece 50 is abutted on the bearing surface 353 of the restricting protrusion 35, and is limited by using the restricting protrusion 35 in order to avoid instable damping piece and the extra noise as a result of shifting of the damping piece 50 during vibration. Moreover, the damping piece 50 can be assembled in the vibration motor 100 stably; therefore the vibration motor 100 has stable performance and high reliability.

The position of the restricting protrusion 35 can also be changed in other embodiments, for example, the bearing surface 353 is formed on the surface of the restricting protrusion 35 far from the cover plate 12 by overturning the restricting protrusion 35.

Figure 5:
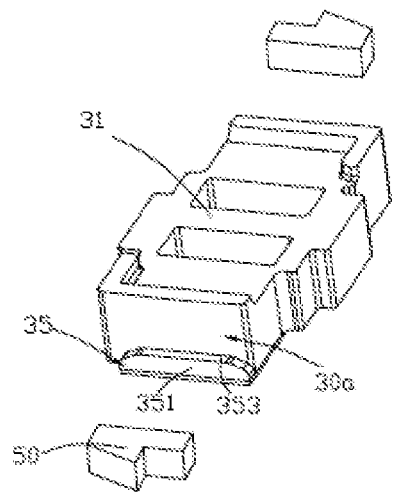
FIG. 5 is an exploded view of a counterweight and a damping piece of a second embodiment of the vibration motor.

An exploded view of the counterweight 31 and the damping piece 50 of the present disclosure in a second embodiment is shown in FIG. 5, wherein the structures of the counterweight 31 and the damping piece 50 are the same as those of the first embodiment as shown in FIG. 1-4. The difference is that the counterweight 31 and the damping piece 50 are not complementary matching structures in this embodiment, specifically two sides 30a of the counterweight 31 facing the elastic connecting piece are presented as planes, and the side on the damping piece 50 facing the counterweight 31 is presented as the plane correspondingly. The restricting protrusions 35 are formed in the way of extending and extruding on two sides 30a of the counterweight 31 facing the elastic connecting piece, wherein the restricting protrusions 35 are arranged in one line generally and comprise main body parts 351 which are abutted to two sides 30a of the counterweight 31 facing the elastic connecting piece only. The bearing surface 353 is formed on the surface of the main body part 351 facing the cover plate; at this time, an adhesive layer (not marked) can also be arranged between the restricting protrusion 35 and the bearing surface preferably in order to fix the damping piece 50 on the restricting protrusion 35. The adhesive layer, for example, can be layer of double-faced adhesive tape, or the resin glue or the gum, etc.

The adhesive layer shall be adhered to the bearing surface 353 of the main body part 351 first during installation; then the damping piece 50 shall be abutted to the bearing surface 353, and limited and fixed on the restricting protrusion 35 by virtue of the adhesive layer in presented of the pressure to be exerted, for example. Moreover, the damping piece 50 can be prevented from shifting during vibration because the restricting protrusion 35 can limit the damping piece 50.

Figure 6:
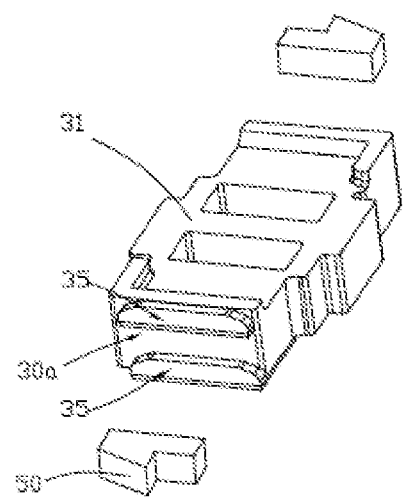
FIG. 6 is an exploded view of a counterweight and a damping piece of a third embodiment of the vibration motor.

The exploded view of the counterweight 31 and the damping piece 50 of a third embodiment of the present disclosure is shown in FIG. 6, wherein the structures of the counterweight 31 and the damping piece 50 in this embodiment are the same as those in the second embodiment shown in FIG. 5. The difference is that two restricting protrusions 35 are arranged on the side 30a of the counterweight 31 facing the elastic connecting piece at interval along the direction vertical to the vibrating direction of the vibrating component 30 in this embodiment, wherein the distance among the two restricting protrusions 35 is applicable for the thickness of the damping piece 50 preferably in order to facilitate holding the damping piece 50 among two restricting protrusions 35 stably.

Of course, the two restricting protrusions 35 can be arranged at interval identically as for the vibration motor in Embodiment 1 in order to facilitate holding the damping piece 50 among two restricting protrusions 35 more stably.

Figure 7:
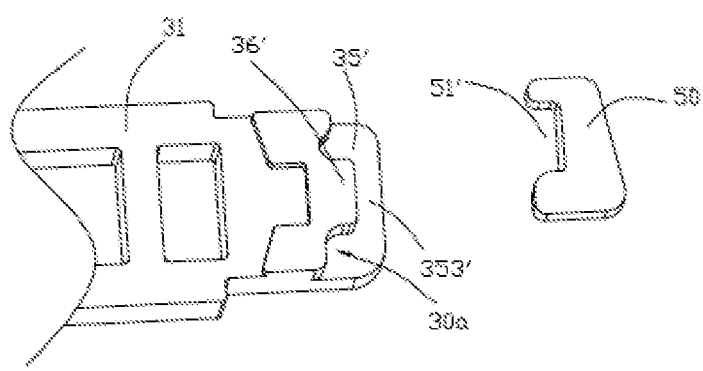
FIG. 7 is an exploded view of a counterweight and a damping piece of a fourth embodiment of the vibration motor.

The exploded view of the counterweight and the damping piece of a fourth embodiment of the present disclosure is shown in FIG. 7. Unlike the first embodiment shown in FIGS. 1-4, the insertion part is formed on the counterweight, while the slot is arranged on the damping piece in this embodiment; as shown in FIG. 7 specifically, the damping piece 50 is provided with a slot 51' in this embodiment; while a restricting protrusion 35' and an insertion part 36' matching with the slot 51' are formed in the way of extending on the counterweight 31 facing the elastic connecting piece, wherein the restricting protrusion 35' has a bearing surface 353' to which the insertion part 36' is adhered. The distance among the insertion part 36' and the elastic connecting piece (not marked) is greater than the distance among the restricting protrusion 35' and the elastic connecting piece in the length direction of the counterweight 31; therefore, a placing space for placing the damping piece 50 can be formed between the insertion part 36' and the restricting protrusion 35'.

The damping piece 50 can be abutted on the bearing surface 353' of the restricting protrusion 35', and the insertion part 36' of the counterweight 31 is inserted into the slot 51' of the damping piece 50. Therefore, the damping piece 50 can be limited on the counterweight 31 stably.

The damping piece can be limited and prevented from shifting during vibration and the instable damping force and the extra noise can be avoided by arranging the restricting protrusion on the counterweight additionally in the vibration motor of the present disclosure. Moreover, the damping piece can be assembled in the vibration motor stably; thus the vibration motor has stable performance and high reliability.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration motor comprising:
    a housing;
    an elastic connecting piece;
    a vibrating component, the vibrating component comprises a counterweight suspended in the housing by the elastic connecting piece;
    a fixed component, the fixed component includes coils while the vibrating component includes a magnet, or the fixed component includes a magnet while the vibrating component includes coils;
    a damping piece, the damping piece is directly fixed on a side of the counterweight and can be subjected to elastic deformation along the vibrating direction of the vibrating component;
    wherein
    the counterweight includes a restricting protrusion extending from the side of the counterweight for abutting against and restricting the damping piece.

2. The vibration motor as described in claim 1, wherein the damping piece and the counterweight are complementary to each other.

3. The vibration motor as described in claim 2, wherein the damping piece comprises an insertion part, and the side of the counterweight is provided with a slot matching with the insertion part; the restricting protrusion comprises a main body part abutting against the side of the counterweight and a projecting part matching with the slot.

4. The vibration motor as described in claim 3, wherein the housing comprises a cover plate; the fixed component is fixed on the cover plate; a bearing surface is formed on a surface of the restricting protrusion facing the cover plate, and matches with a contact surface on the damping piece correspondingly.

5. The vibration motor as described in claim 4, wherein the vibrating component comprises a magnet and a pole plate; the magnet is accommodated in the counterweight; and the pole plate is adhered to an end surface on the counterweight far from the cover plate.

6. The vibration motor as described in claim 2, wherein the counterweight comprises an insertion part formed in the way of extending on the side of the counterweight, and the damping piece is provided with a slot matching the insertion part; the restricting protrusion has a bearing surface to which the insertion part is adhered.

7. The vibration motor as described in claim 1, wherein the side of the counterweight is a plane; the restricting protrusion comprises a main body part abutting against the side of the counterweight; and an adhesive layer is also arranged between the damping piece and the main body part.

8. The vibration motor as described in claim 7, wherein the adhesive layer is a layer of double-faced adhesive tape, or a layer of resin glue or gum.

9. The vibration motor as described in claim 2, wherein two restricting protrusions are arranged on the side of the counterweight at interval along a direction vertical to a vibrating direction of the vibration motor.

* * * * *